Jan. 2, 1968  A. J. NICHOLSON  3,361,283
METER BOX SNAP CATCH ASSEMBLY
Filed Jan. 13, 1966
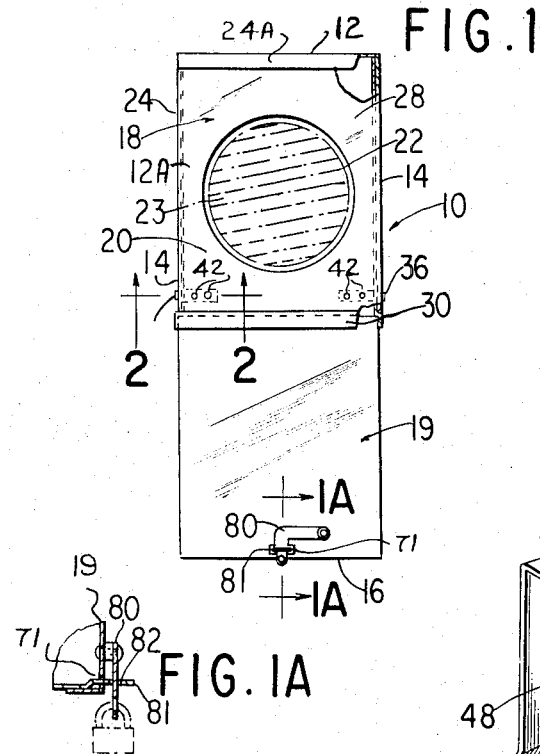
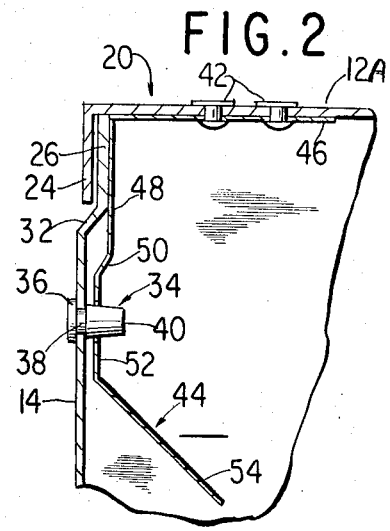
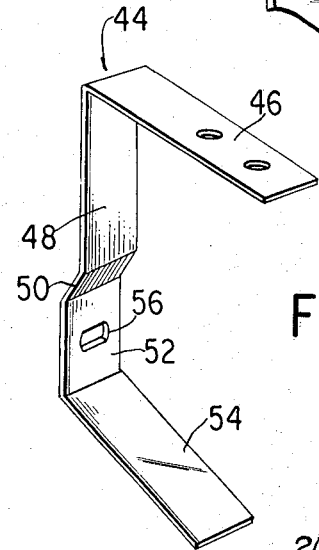
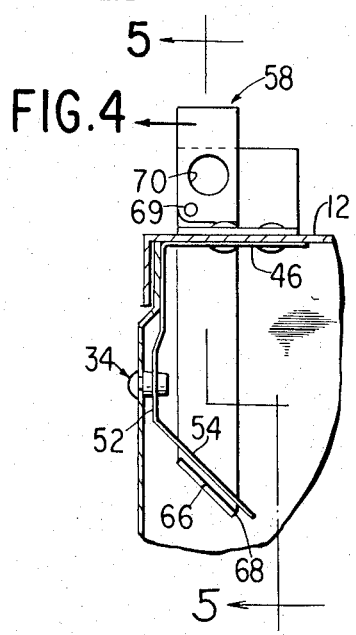
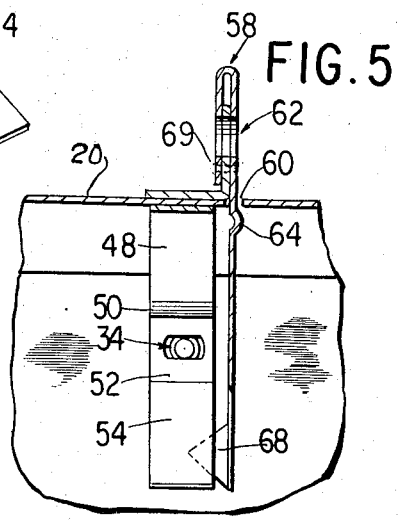
INVENTOR
ALFRED J. NICHOLSON
BY
Smythe & Moore
ATTORNEYS United States Patent Office 3,361,283
Patented Jan. 2, 1968

3,361,283
METER BOX SNAP CATCH ASSEMBLY
Alfred J. Nicholson, Methuen, Mass., assignor to Sola Basic Industries, Inc., Milwaukee, Wis., a corporation of Wisconsin
Filed Jan. 13, 1966, Ser. No. 520,415
9 Claims. (Cl. 220—3.8)

The present invention relates to an electric meter such as used in conjunction with electric utilities, and more particularly to a meter box wherein there is provided a removable or detachable cover for closing off the open front of the meter box and a catch or fastening means for securing the cover to the meter box frame.

In the meter field, there are generally two different types of meter socket boxes. One general type is known as a ring socket in which the socket is provided with a removable cover having an opening therein. In this type of meter socket, the meter is generally placed through an opening in the removable box cover after the cover has been locked in place on the meter socket. The meter is fastened to the cover by a ring that secures the meter to a flange about the opening in the removable box cover.

The other type of meter socket generally used is known as a ringless socket, and a removable or detachable cover is also provided having an opening therein. In this type of installation, the meter is placed in position in the socket before the cover is placed on the meter socket box. The cover is then placed on the meter socket box with the opening in the cover fitting over the meter, and the removable cover can be locked in place to firmly secure it to the box and the ringless socket.

One of the objects of the present invention is to provide an improved fastening or locking means or cover latch for securing the cover to the meter box in a more facile and simple manner.

Another object of the present invention is to provide a simple catch arrangement to prevent the cover member of the meter box from becoming inadvertently detached from the box.

In one aspect of the invention, an open meter box is provided including cover means having an opening through which the meter protrudes. A catch member is provided which may be in the form of a stud or wedge-shaped projecting member. A resilient latch member is provided having an aperture therein snappable over the stud so as to keep the cover member secured to the meter box. Preferably, the studs are mounted on each side of the box and the resilient latch members on the cover near the lower end thereof.

In a further aspect of the invention, lever means are provided which can be actuated or pulled into contact with the resilient latch member so as to cause the resilient member to become disengaged or to slide off of the catch member so that the cover member can be readily detached from the meter box.

In one form, the box means is arranged so that there is an upper cover means which is removably held in place by the latch and resilient members, the upper cover having a lip thereon. A lower cover is arranged so that its upper edge can be slipped under the lip and the lower portion engageable by a lock means.

Various other objects, advantages and features of the invention will be apparent from the following description and drawings which are merely exemplary.

In the drawings:

FIG. 1 is a front view of a meter box embodying the present invention, with parts broken away;

FIG. 1A is a fragmentary view taken along the line 1A—1A of FIG. 1;

FIG. 2 is an enlarged fragmentary view of a portion of the meter box taken in the direction 2—2 of FIG. 1;

FIG. 3 is a perspective view of the resilient member embodied in the latch means of the invention;

FIG. 4 is a fragmentary detailed view of the latch means embodied in the invention further illustrating lever means utilized to actuate the resilient member; and FIG. 5 is a detailed rear view taken along the line 5—5 of FIG. 4.

Referring to the drawings, reference numeral 10 generally designates a meter box having a base with a top wall 12 and opposite side walls 14 and a bottom wall 16. The front 18 of the meter box is provided with an upper cover member 20 having a central circular opening 22 therein for receiving a meter 22 therein. The meter box cover member 20 is detachably connected to the front of the meter box 10 as will be described hereafter. The top 12 of the meter box is provided with a downwardly extending front lip or rim 24A which encloses the upper edge of the cover member 20.

The upper cover member 20 has a main vertical portion 28 which extends downwardly and has at its lower end a flange or lip 30 (FIG. 1) into which can be slipped the upper edge of lower cover 19 after the upper cover is in place on the box.

The meter box upper cover member 20 is normally secured or fastened to the front of the meter box by a latch assembly which comprises a catch or stud member 34 mounted near the lower end of each of the side walls of cover 20. The catch or latch member 34 has a head 36 thereon and a reduced pin portion 38 extending through the main portion 28, with a tapered portion 40 disposed adjacent the inner surface of the main portion 28. The tapered portion 40 is substantially oblong or rectangular shape in cross section.

The top cover 12 of the meter box has riveted thereto by two rivet members 42 a resilient strip latch member 44 which is normally fastened to or mounted on the latch or catch member 34 so as to secure the cover member 20 to the meter box. Referring to FIG. 3, the resilient latch member consists of a section 46 through which the rivets 42 extend and a second straight portion 48 disposed at right angles with respect to the section 46. The resilient member is curved outwardly at 50, and then straight to provide a flat side section 52 which terminates in an inclined end portion 54. The flat section 52 is provided with an opening or aperture 56 therein of the same configuration as the outer surface of the tapered portion 40 of the catch or stud which extends therethrough when assembled, as best seen in FIG. 2.

The resilient member 44 is disposed within the box so that its section 48 is spaced closely adjacent the side lip 24 of the top 12, but spaced sufficiently away therefrom so as to provide a slot or opening into which the lip 26 of the side walls 14 can fit. The resilient member 44 is preferably made of resilient sheet metal so that when it assumes the configuration as shown in FIG. 2, the tapered portion 40 of the catch will be wedged within the opening 56 of the resilient member so that the cover will be securely fastened or latched to the meter box.

When it is desired to detach the front cover member 20 from the box and after lower cover 19 has been removed, it is only necessary to reach under the lower edge of cover 20 and to pull the resilient member 44 inwardly or toward the center of the meter box so that the tapered catch member 34 will be removed from the opening 56 of the resilient member. Thereafter, the cover member 20 can be manipulated so that its end can be slipped downwardly from upper front lip 24A and the cover removed.

Referring to FIGS. 4 and 5, a lever 58 is shown extending through a slot 60 in the front wall of cover 20. The lever 58 extends outwardly of the cover and is preferably made of a sheet metal strip. The upper end of the lever 58 is bent back upon itself to form a U-shaped portion 62. The lever 58 is provided with a rib or dimples 64 therein just below the U-shaped portion 62 which acts as a stop when the lever 58 is moved into contact with the front wall of cover 20. The U-shaped upper portion 62 prevents the lever 58 from falling from the slot 60 into the meter box.

The inner edge of the lever 58 is diagonally inclined as indicated at 66 and has disposed thereon a triangular member 68 adapted to contact the inclined section 54 of resilient member 44.

Movement of lever 58 in an outward direction causes the triangular member 68 to cam or move the inclined section 54 of the resilient member in a direction to cause the flat section 52 of the resilient member to become unwedged or disengaged from the tapered portion 40 so that the cover member 20 may be readily removed from the meter box. An aperture 70 is provided which can receive a lock.

In a further form, although not absolutely necessary, lower cover 19 is arranged so that the upper edge can be slipped under lip 30, and aperture 71 swung over extension 81. Extension 81 has a slot 82 therein for receiving a swingable locking means 80.

Thus, the present invention provides a snap catch assembly that can be readily made from a resilient sheet metal member and can be readily attached to the interior of a meter box so that it will coact with a latch or catch member secured to the removable cover member of a meter box.

It is also apparent that the present invention provides a latch for a cover member having lever means that produces a camming action on a resilient member so that the resilient member is unwedged or detached from a latch member carried by the cover member.

Inasmuch as various changes may be made in the form, location and relative arrangement of the several parts without departing from the essentail characteristics of the invention, it will be understood that the invention is not to be limited except by the scope of the appended claims.

What is claimed is:

1. In a meter box having box means, removable cover means and a latch to hold the parts in assembled relationship, the combination including a catch member secured to one of said means, and a resilient latch member secured to one of said means, said catch member having a projecting portion and said resilient latch member having an aperture therein into which said projecting portion is adapted to fit in frictional engagement therewith, when the cover is in assembled relation with said box means.

2. The device in claim 1 wherein there are a pair of catch means and a pair of resilient means, the latch means being attached to the sides of the box and the resilient members being attached to the cover.

3. The device of claim 1 wherein the box means has a lower cover.

4. The device of claim 2 wherein the top of the box has a lip extruding downwardly under which the upper edge of the cover members is slipped.

5. The device of claim 1 wherein lever means is provided for actuating said resilient member to disengage it from said catch member.

6. The device of claim 5 wherein there are a pair of catch means and a pair of resilient means, the latch means being attached to the sides of the box and the resilient members being attached to said cover, each having lever means associated therewith.

7. The device of claim 2 wherein each of the resilient means has a portion substantially parallel to the sides of the box and an inwardly inclined portion extending therefrom.

8. The device of claim 7 wherein lever means extend inwardly from the exterior of the box to be engageable with said incline portion so as to cam said resilient members inwardly and disengage them from the catch members.

9. The device of claim 8 wherein the lever means have removable means to lock them in place when the cover is in assembled relation on the box.

References Cited

UNITED STATES PATENTS

| | | | |
|---|---|---|---|
| 2,695,923 | 11/1954 | Lajeunesse et al. | 317—109 X |
| 3,087,097 | 4/1963 | Janson | 317—109 |
| 3,112,839 | 12/1963 | Hallhaver | 220—3.8 |

JOSEPH R. LECLAIR, *Primary Examiner.*

G. T. HALL, *Assistant Examiner.*